United States Patent Office 2,864,680
Patented Dec. 16, 1958

2,864,680
HERBICIDES RELATED TO 1,4,5,6-TETRACHLOROBICYCLO(2.2.1)-5-HEPTENE

Edward R. Degginger, North Syracuse, N. Y., assignor to Allied Chemical Corporation, a corporation of New York No Drawing. Application January 31, 1957
Serial No. 637,375

8 Claims. (Cl. 71—2.3)

This invention relates to herbicides and more particularly refers to new compounds and their use as herbicides.

An object of the present invention is to provide new compounds effective for use as herbicides.

The new compounds of the present invention are:

1,4,5,6-tetrachloro-2-acetoxybicyclo-(2.2.1)-5-heptene

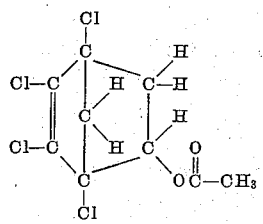

1,4,5,6-tetrachlorobicyclo-(2.2.1)-5-heptenol-2

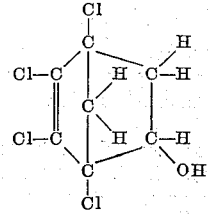

1,4,5,6-tetrachlorobicyclo-(2.2.1)-5-heptenone-2

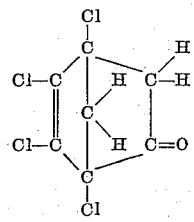

The following examples illustrate methods of preparation of three new compounds:

EXAMPLE I

Preparation of 1,4,5,6 - tetrachloro - 2 - acetoxybicyclo-(2.2.1)-5-heptene. A mixture of 1600 grams of tetrachlorocyclopentadiene and 4000 grams of stabilized vinyl acetate are placed in a two gallon autoclave and heated at 100–110° C. for one hour and at 130–140° C. for an additional four hours. After evaporating off the excess vinyl acetate, the product is distilled at reduced pressure; B. P. 117–125° C./1 mm. 1500 grams of 1,4,5,6-tetrachloro - 2 - acetoxy - bicyclo - (2.2.1) - 5 - heptene (66% of theory) is recovered.

EXAMPLE II

Preparation of 1,4,5,6 - tetrachlorobicyclo - (2.2.1) - 5-heptenol-2. A mixture of 800 grams of 1,4,5,6-tetrachloro - 2 - acetoxy - bicyclo - (2.2.1) - 5 - heptene in 2500 ml. of absolute methanol and 100 ml. of concentrated hydrochloric acid is refluxed for seventy-two hours. Crude 1,4,5,6 - tetrachloro - 2 - acetoxy - bicyclo-(2.2.1)-5-heptene may be used directly after stripping off the excess vinyl acetate (described in the preparation of compound 1,4,5,6 - tetrachloro - 2 - acetoxy - bicyclo-(2.2.1)-5-heptene). The cooled mixture is then poured over 4000 grams of cracked ice in 2000 ml. of water. The oil which separates is distilled. Distillation yields 615 grams (90% of theory) of 1,4,5,6-tetrachlorobicyclo-(2.2.1)-5-heptenol-2; B. P. 103–8°/0.7–1.2 mm. Compound 1,4,5,6 - tetrachlorobicyclo - (2.2.1) - 5 - heptenol-2, after distillation, crystallizes with some difficulty. The addition of hydrocarbon solvents facilitates crystallization; M. P. 78–80° C. A granular, allotropic, crystalline form sometimes crystallizes from the distilled product; M. P. 94.6–96.2° C.

EXAMPLE III

Preparation of 1,4,5,6 - tetrachlorobicyclo - (2.2.1)-5-heptenone-2. In a 5-1.-3-necked flask is placed 300 g. (1 mol) of sodium dichromate, 405 g. (4 mols) of contrated sulfuric acid, and 1000 cc. of water. The water is added last to the stirred mixture to facilitate solution. Observe caution. The flask is fitted with a reflux condenser and a thermometer. While maintaining a temperature of 70–90° C., 495 g. (2 mols) of liquid 1,4,5,6-tetrachlorobicyclo-(2.2.1)-5-heptenol-2 is added slowly. After the addition of the alcohol, stirring and heating are continued for several hours. The stirring should be very vigorous to achieve good contact between the liquid layers. The oil layer is dissolved in hexane and washed free of acid with water. The hexane solution is dried over "Drierite," filtered and concentrated. About 110 g. of white crystals will separate (1,4,5,6-tetrachlorobicyclo-(2.2.1)-5-heptenone-2); M. P. 103.6–5.3° C. (22% yield).

Compounds 1,4,5,6 - tetrachloro - 2 - acetoxy - bicyclo - (2.2.1) - 5 - heptene, 1,4,5,6 - tetrachlorobicyclo-(2.2.1) - 5 - heptenol - 2 and 1,4,5,6 - tetrachlorobicyclo-(2.2.1)-5-heptenone-2 have been found to have a high herbicidal activity, and also, notably 1,4,5,6-tetrachlorobicyclo - (2.2.1) - 5 - heptenol - 2 and 1,4,5,6 - tetrachlorobicyclo-(2.2.1)-5-heptenone-2, show a high herbicidal selectivity; they show a strong herbicidal activity along with little or no plant injury. For purposes of marketing and application, it is usually desirable to admix the herbicidal compound with other materials. These formulations may be in the form of a solution wherein the herbicide is dissolved in a suitable solvent, such as acetone, alcohols or aromatic hydrocarbons, dust formulation wherein the herbicide is admixed with an inert solid diluent, such as pyrophyllite and talc, and wettable powder formulation composed of a mixture of herbicide, inert diluent and wetting and dispersing agents. The herbicides of the present invention are particularly useful to selectively destroy or retard growth of weeds without material injury to the crops. They are preferably applied as a pre-emergence treatment, that is, after planting seeds of the crop but before emergence of the crop, but may also be applied as a post-emergence treatment. The amount of herbicide to be applied will vary dependent upon such factors as the nature of the crop, type of weeds to be destroyed, extent of growth, soil type, etc., and may vary from about 1 to 30 lbs. or more per acre of growth.

The new herbicides were applied as pre-emergence treatments in a greenhouse to determine the responses of seven plant species, as shown in the following examples. The greenhouse test procedure is that published by Shaw in Weeds, vol. 1, No. 4, July 1952.

EXAMPLE IV

The results of applying 1,4,5,6-tetrachloro-2-acetoxy-bicyclo-(2.2.1)-5-heptene in the form of a solution in acetone to flats seeded with corn, cotton, wheat, soybeans and rape in the proportion of 16 lbs. 1,4,5,6-tetrachloro - 2 - acetoxy - bicyclo - (2.2.1) - 5 - heptene per acre, is summarized in Table 1 below. The treatments were rated 20 days after application.

Table 1

|  | Corn | Cotton | Wheat | Soybeans | Rape |
|---|---|---|---|---|---|
| IR [1] | 0 | 0 | 0 | 0 | 9 |
| Percent HR [1] | 6 | 3 | 15 | 4 | 18 |
| Percent PK [1] | 0 | 0 | 0 | 0 | 85 |

[1] Index to symbols—IR=injury rating 0–10; 0, no injury; 1–3, light injury; 3–6, moderate injury (plants usually recover with reduced yields); 7–9, severe injury (plants usually die); 10, all plants killed. Percent HR= percent height reduction. Percent PK=percent plants killed.

EXAMPLE V

In a similar test, 1,4,5,6-tetrachlorobicyclo-(2.2.1)-5-heptenol-2 was applied as a pre-emergence treatment in the proportion of 16 lbs. 1,4,5,6 - tetrachlorobicyclo-(2.2.1)-5-heptenol-2 per acre, to flats seeded with corn, cotton, soybeans, crabgrass, ryegrass and rape, as shown in Table 2:

Table 2

|  | Corn | Cotton | Soybeans | Crabgrass | Ryegrass | Rape |
|---|---|---|---|---|---|---|
| IR | 0 | 0 | 1 | 9 | 9 | 10 |
| Percent HR | 13 | 27 | 26 | 20 | 13 | 100 |
| Percent PK | 0 | 0 | 11 | 90 | 90 | 100 |

EXAMPLE VI

In a similar test, 1,4,5,6-tetrachlorobicyclo-(2.2.1)-5-heptenone-2 was applied as a pre-emergence treatment in the proportion of 16 lbs. 1,4,5,6-tetrachloro-bicyclo-(2.2.1)-5-heptenone-2 per acre, to flats seeded with wheat and rape, as shown in Table 3:

Table 3

|  | Wheat | Rape |
|---|---|---|
| IR | 0 | 9 |
| Percent HR | 8 |  |
| Percent PK | 0 | 95 |

For comparative check purposes, acetone without any herbicide was applied to plots in the proportion of 40 gallons per acre and found to have no effect on the plants. Also untreated flats were employed for check purposes.

From the foregoing Tables 1, 2 and 3, it will be noted that 1,4,5,6 - tetrachloro - 2 - acetoxy - bicyclo - (2.2.1)-5-heptene effectively controlled broad-leaf weeds, represented by rape, but did not injure crops. 1,4,5,6-tetrachloro - bicyclo - (2.2.1) - 5 - heptenol - 2 effectively controlled both broad-leaf weeds and grass, represented by crabgrass and ryegrass, and little or no crop injury resulted from its use. 1,4,5,6 - tetrachlorobicyclo-(2.2.1)-5-heptenone-2 exhibited excelelnt broad-leaf weed control and little or no crop injury resulted from its use.

Although certain preferred embodiments of the invention have been disclosed for purpose of illustration, it will be evident that various changes and modifications may be made therein without departing from the scope and spirit of the invention.

I claim:

1. A compound suitable for use as a herbicide selected from the group consisting of 1,4,5,6-tetrachloro-2-acetoxy - bicyclo - (2.2.1) - 5 - heptene, 1,4,5,6 - tetrachlorobicyclo-(2.2.1)-5-heptenol-2 and 1,4,5,6-tetrachlorobicyclo-(2.2.1)-5-heptenone-2.

2. 1,4,5,6 - tetrachloro - 2 - acetoxy - bicyclo - (2.2.1)-5-heptene.

3. 1,4,5,6-tetrachlorobicyclo-(2.2.1)-5-heptenol-2.

4. 1,4,5,6 - tetrachlorobicyclo - (2.2.1) - 5 - heptenone-2.

5. A method for controlling the growth of weeds which comprises applying to an area on which weed growth is to be retarded in an amount sufficient to exert a herbicidal action a compound selected from the group consisting of 1,4,5,6 - tetrachloro - 2 - acetoxy - bicyclo-(2.2.1) - 5 - heptene, 1,4,5,6 - tetrachlorobicyclo - (2.2.1)-5-heptenol-2 and 1,4,5-tetrachlorobicyclo-(2.2.1)-5-heptenone-2.

6. A method for controlling the growth of weeds which comprises applying 1,4,5,6-tetrachloro-2-acetoxy-bicyclo-(2.2.1)-5-heptene to an area on which weed growth is to be retarded in an amount sufficient to exert a herbicidal action.

7. A method for controlling the growth of weeds which comprises applying 1,4,5,6 - tetrachlorobicyclo - (2.2.1)-5-heptenol-2 to an area on which weed growth is to be retarded in an amount sufficient to exert a herbicidal action.

8. A method for controlling the growth of weeds which comprises applying 1,4,5,6 - tetrachlorobicyclo - (2.2.1)-5-heptenone-2 to an area on which weed growth is to be retarded in an amount sufficient to exert a herbicidal action.

References Cited in the file of this patent

UNITED STATES PATENTS 2,736,730    Kleiman _____ Feb. 28, 1952

OTHER REFERENCES

Fields: J. Am. Chem. Soc. 76 (1954), 2709–10.
McBee et al.: J. Am. Chem. Soc. 77 (1955), 4427–8.